(No Model.)
D. CRUICE & F. HIMMEL.
HOOF CLASP.
No. 380,093. Patented Mar. 27, 1888.
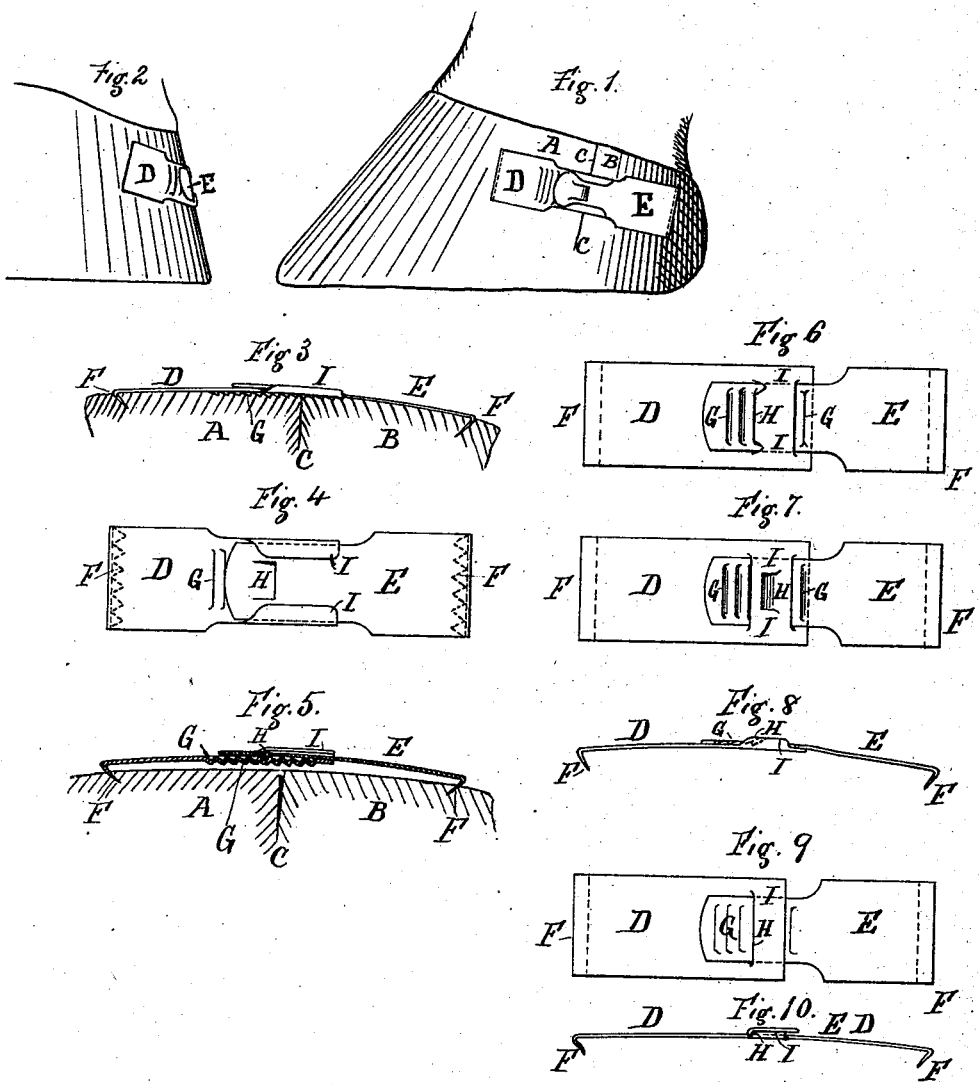
WITNESSES:-
A. M. Pierce.
C. C. Weightman.
INVENTORS:-
Daniel Cruice
Franz Himmel
per Wm. Weightman
Atty.

UNITED STATES PATENT OFFICE.

DANIEL CRUICE AND FRANZ HIMMEL, OF NEW YORK, N. Y.

HOOF-CLASP.

SPECIFICATION forming part of Letters Patent No. 380,093, dated March 27, 1888.

Application filed July 2, 1887. Serial No. 243,256. (No model.)

*To all whom it may concern:*

Be it known that we, DANIEL CRUICE and FRANZ HIMMEL, citizens of the United States, residing in the city, county, and State of New York, have invented certain new and useful Improvements in Hoof-Clasps, of which the following is a specification, reference being had to the accompanying drawings.

Our invention has special reference to the improved construction and operation of clasps for the closing up of cracks in animal hoofs. The object of such improved construction is the production of a clasp that will project as little as possible above the hoof surface and avoid the special inlaying of any portion of the clasp. The object of the improved operation of the clasp is that of effecting the closing and locking of the clasp with as little harsh treatment or hammering of the hoof as possible.

The application of the hoof-clasp, especially to the hind hoofs, is a quite dangerous operation under any conditions, and of course any increased worriment to the animal is increased risk to the operator. Hence our improvements consist in the construction of the hoof-clasps in such manner that they are self-locking; that thin sheet metal may be used, and that the hoof-crack being closed and the clasp locked there will be no portion of the clasp projecting either inwardly or outwardly sufficient to mar the appearance of the hoof while the clasps are in place or when they are removed; or, again, when the clasp is placed on the inner quarter of the hoof there shall be no risk of "interference" or of the consequent abrasion of the skin above the hoof.

Referring to the drawings, Figures 1 and 2 represent side and partial front views of a hoof with our improved clasp in place. Figs. 3, 4, and 5 represent side, plan, and sectional views of our improved clasp. Also, Figs. 6, 7, 8, 9, and 10 represent modifications of the same.

Similar letters of reference designate like portions of the clasp in all the figures.

Letters A and B designate two portions of a cracked hoof with the crack C between.

D designates the receiving portion, and E the entering portion, of the hoof-clasp, and at the ends of each of these portions, and forming an integral part thereof, are attached or formed the hooks or prongs F. By means of such hooks or prongs the closing draft is brought to bear upon the separated portions A and B to draw them together and close the crack between. These hooks or prongs may be of plain chisel shape, as shown in Figs. 5 to 10, or of saw-tooth shape, as defined in Figs. 3 and 4.

G designates a series of stop-grooves formed in either portion D or E, as may be preferred. In Figs. 1 to 5 they are shown as formed in the receiving portion D; in Figs. 6 to 10, as formed in the entering portion E.

H designates a tongue bent to project into some one of the said stop-grooves, as shown in section, Fig. 5, to lock the two portions together and prevent any backward movement of either portion of the clasp tending to release the hoof portions on each side of the crack.

I designates the retaining or loop portions on the receiving portion D, to form side guides and receive the entering portion E of the clasp.

In Figs. 6, 9, and 10 the tongue portion H is formed at the outer edge of these retaining-loops, instead of specially cutting and forming it, as shown in the other figures.

In the operation of the clasp the two portions, preferably made of steel, are partially entered into each other and into the hoof, as shown in Fig. 5. A hand vise or clamp is then applied to the end bends at F, the prongs squeezed to a full depth into the hoof, and the portions A and B closed at the crack C, when the two portions of the clasp being forced—the one into the other—the tongue H slips or settles into the stop-groove beneath, and the whole remains firm, holding the crack to a close joint. The vise is then removed, and any projecting portions of the clasp leveled to a neat appearance and the tongue H fixed to a close grip by one or two slight blows with a hammer. For special security, the projecting ends of the entering portions E may be return-bended, as shown in Fig. 10.

What we claim as new, and desire to secure by Letters Patent, is—

A hoof-clasp consisting of the portions D and E, having the hooks or prongs F, one of said portions being also provided with a tongue bent to project into a stop-groove formed in the other, substantially as set forth.

DANIEL CRUICE.
FRANZ HIMMEL.

Witnesses:
WM. H. WEIGHTMAN,
A. M. PIERCE.